UNITED STATES PATENT OFFICE.

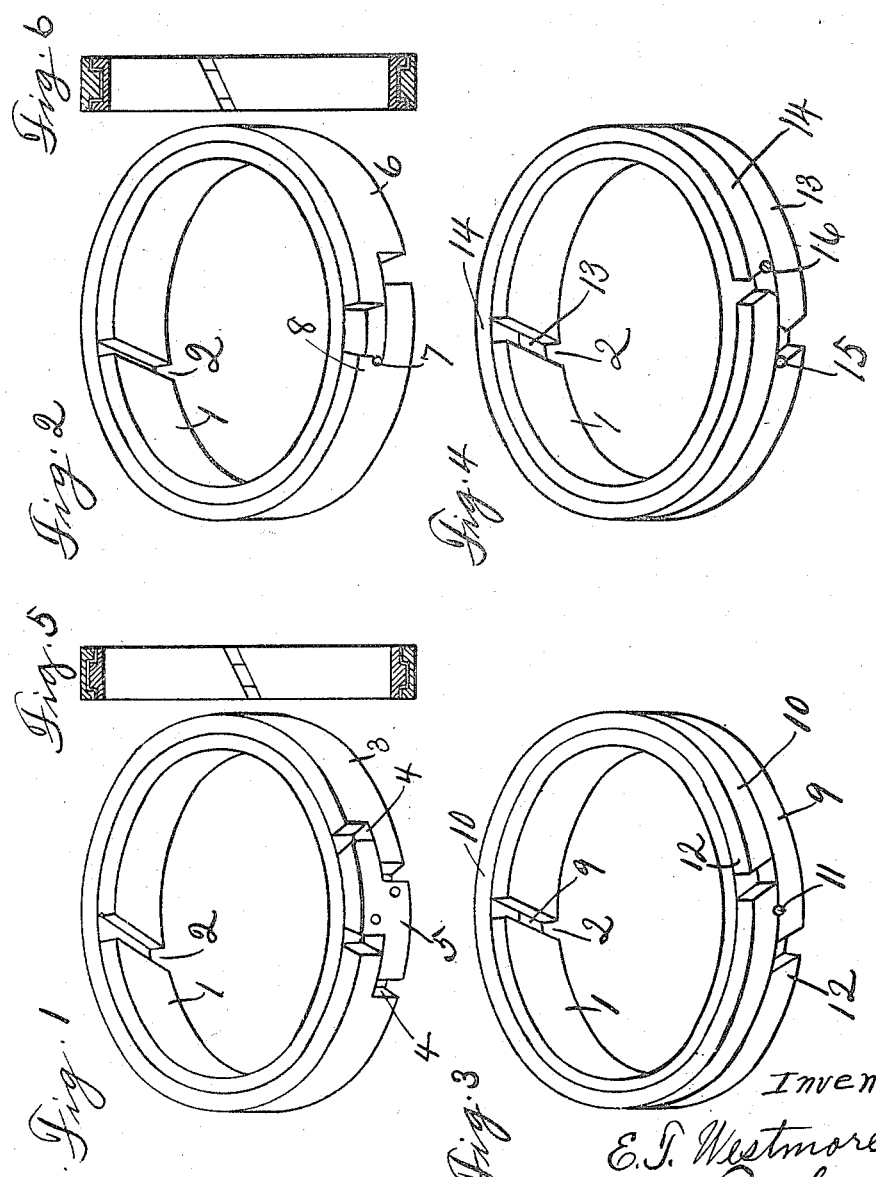

ERNEST T. WESTMORELAND, OF CHILDRESS, TEXAS.

PACKING-RING.

1,232,140. Specification of Letters Patent. Patented July 3, 1917.

Application filed October 16, 1915, Serial No. 56,219. Renewed May 17, 1917. Serial No. 169,341.

*To all whom it may concern:*

Be it known that I, ERNEST T. WESTMORELAND, a citizen of the United States, residing at Childress, in the county of Childress and State of Texas, have invented certain new and useful Improvements in Packing-Rings, of which the following is a specification.

My invention relates to packing rings for pistons and the like; and the object is to provide a simple packing ring which has continual packing surfaces on the upper and lower edges and on the periphery thereof and which is expansible and resilient; other objects and advantages will be fully explained in the following description and the invention will be more particularly pointed out in the claims.

Reference is had to the accompanying drawings which form a part of this application.

Figure 1 is a perspective view of the improved packing ring. Fig. 2 is a similar view of a variation in the construction of the packing ring. Fig. 3 is a similar view of another variation from the ring shown in Fig. 1. Fig. 4 is a similar view of another variation from the ring shown in Fig. 1. Figs. 5 and 6 are diametrical sections of packing rings which are variations in construction of the rings shown in Figs. 1 and 2.

Similar characters of reference are used to indicate the same parts throughout the several views.

The improved packing ring includes inner and outer members. The inner member 1 is an open ring, having an opening at 2. The outer member 3 is an open ring, terminating with stepped ends 4. A stop 5 is rigidly attached to the inner member 1 and this stop has stepped ends to meet the stepped ends 4 to form a lapped or stepped joint. The stop 5 conforms in cross-sectional area to the cross-sectional area of ring 3 and coöperates with the ring 3 to form a continuous peripheral surface and also to maintain the balance of the rings 1 and 3. The expansion of the inner ring 1 and the outer ring 3 is at substantially diametrically opposite points. The outer ring 3 bridges the opening 2 in the inner ring 1 to form a continuous peripheral surface and to form continuous packing surfaces on the bottom and top edges. There can be no leaking past the ring on the periphery or on the top or bottom edge.

The ring shown in Fig. 2 has the same inner ring 1 with the opening 2. The outer ring 6 is an open ring with the opening diagonally opposite the opening 2 of ring 1 for the purpose of keeping the pressure balanced. In order to maintain this balance a dowel pin 7 is inserted in and made rigid with ring 1. The ring 6 has the severed portions stepped to form a lapped joint and the end 8 has a recess to receive the pin 7 so that the pin will not interfere with the making of the lapped joint. The balance of the rings 1 and 6 cannot be destroyed because of the pin 7. Like the form of the ring shown in Fig. 1, the form of Fig. 2 has a continuous peripheral surface and continuous packing surfaces are maintained on the bottom and top edges.

The form of ring shown in Fig. 3 has the same inner member 1 with the opening 2, but the outer member is in two parts 9 and 10. The parts 9 and 10, when placed on a piston, are locked together by a dowel pin 11 which is rigid with the ring 1, the dowel pin 11 being diametrically opposite the opening in ring 1. The parts 9 and 10 are both open rings and each has an expansion part 12. The ring shown in Fig. 3 has the same functional advantages which the ring shown in Fig. 1 has, the balancing points of the rings being maintained diagonally opposite in both rings.

The form of ring shown in Fig. 4 has the same inner member 1 with the opening 2. The outer member is composed of two parts 13 and 14. The members 13 and 14 lap on each other, and, when placed on a piston, are held against displacement by dowel pins 15 and 16. The functional advantages, as to sealing on the periphery and on the top and bottom, are the same as those of the packing ring shown in Fig. 1.

It is necessary to have the opening of the interior member of the packing ring substantially diametrically opposite the opening in the exterior member for the purpose of maintaining a proper balance of the packing members. The means shown in all four of the forms have the openings of the exterior member substantially opposite the openings of the interior member.

The forms shown in Figs. 1 and 2 may have a channeled construction, such as shown respectively in Figs. 5 and 6.

The ring members may be of any desirable size as to depth and thickness and diameter. The stop 5 and the dowel pins 7, 11, 15, and 16 all serve as stops to hold the rings in balance.

What I claim, is,—

1. A packing ring comprising an inner open ring member and an outer open ring member co-extensive with the peripheral surface of the inner member, the opening of the outer member being substantially diametrically opposite the opening of the inner member and the severed portions of the outer member having stepped ends, and a stop having the same thickness and width as said inner and outer members coöperating with the severed portions of said outer member to hold the said inner and outer members in balanced relation and to form leak proof joints with said stepped ends.

2. A packing ring comprising an inner open expansible ring member, a stop rigid therewith on the exterior thereof and having the same width and having a step on the upper side at one end and a step on the lower side at the other end and an outer open expansible ring member equal in width to said inner member and having the severed ends stepped to conform in contour to the steps in said stop and engaging the steps of said stop.

In testimony whereof, I set my hand this 9th day of October, 1915.

ERNEST T. WESTMORELAND.